United States Patent [19]

Jakob

[11] Patent Number: 4,968,054
[45] Date of Patent: Nov. 6, 1990

[54] COUPLING

[75] Inventor: Lothar Jakob, Gottmadingen, Fed. Rep. of Germany

[73] Assignee: Georg Fischer AG, Schaffhausen, Switzerland

[21] Appl. No.: 344,055

[22] Filed: Apr. 27, 1988

[30] Foreign Application Priority Data

Apr. 27, 1988 [CH] Switzerland .................. 01572/88

[51] Int. Cl.$^5$ .............................................. B60D 1/02
[52] U.S. Cl. ............................... 280/507; 280/509
[58] Field of Search ................... 280/507, 508, 509

[56] References Cited

U.S. PATENT DOCUMENTS

| 919,469 | 4/1909 | Rude | 280/508 |
|---|---|---|---|
| 4,071,263 | 1/1978 | Kunze | 280/508 |
| 4,721,324 | 1/1988 | Blacklaw | 280/507 X |

FOREIGN PATENT DOCUMENTS

| 3410012 | 9/1985 | Fed. Rep. of Germany | 280/507 |
|---|---|---|---|
| 522540 | 4/1921 | France | 280/508 |
| 727222 | 11/1931 | France | 280/509 |

Primary Examiner—Charles A. Marmor
Assistant Examiner—Mitchell Bompey
Attorney, Agent, or Firm—Bachman & LaPointe

[57] ABSTRACT

The present invention relates to a hitching device with automatic coupling, applicable in particular to the joining of automotive tractors to their trailers.

This device consists essentially of a fork, in which the pulling member arranged on the tractor engages. Mounted on one of the branches of the fork is a closing arm which can be positioned transversely to the two branches so as to retain the pulling member between them.

This arm is integral with a control lever, upon which the pulling member acts when it is reversed, so as to bring it to the coupling position.

The closing arm is immobilized in this position by a locking device comprising a lock which engages in an indentation of the closing arm and which may be disengaged manually so as to release the closing arm in order to uncouple the trailer.

10 Claims, 1 Drawing Sheet

COUPLING

BACKGROUND OF THE INVENTION

The present invention is drawn to a coupling device for locking and unlocking the fifth-wheel kingpin of a semitrailer. Heretofore fifth-wheel couplings previously used by locking and unlocking the kingpin of the fifth-wheel were designed as forgings and were extremely heavy in order to absorb the forces encountered during the locking and unlocking operation. Typical coupling devices comprised a lever having a locking projection which engaged a coupling claw for locking and unlocking the fifth-wheel kingpin. The lever was designed as a two-arm lever having relatively small leverage thereby leading to the necessity for large weighty forgings. It is known in the prior art to provide a locking bar for holding the coupling claw in place instead of a locking lever as noted above. Employing a locking bar reduced the overall weight of the coupling; however, the locking bar required a complex guide mechanism for locking the coupling claw in place.

Naturally it would be highly desirable to provide a coupling device for locking and unlocking the fifth wheel kingpin of a semitrailer which is simple and light in both construction and operation.

Accordingly, it is a principal object of the present invention to provide a coupling device for locking and unlocking the fifth-wheel kingpin of a semitrailer.

It is a further object of the present invention to provide a coupling device as set forth above which is efficiently designed and simple to operate.

Further objects and advantages of the present invention will appear hereinbelow.

SUMMARY OF THE INVENTION

The present invention relates to a device for locking and unlocking the fifth-wheel of a kingpin of a semi-trailer.

In accordance with the present invention the coupling device comprises a pick-up plate having a coupling jaw provided with a recess for receiving the fifth-wheel kingpin of a semitrailer when the kingpin is locked in position by the coupling device. The locking mechanism for holding the fifth-wheel kingpin in the locked position in the recess of the coupling jaw comprises a coupling claw which is pivotably mounted on the pick-up plate between a first position for locking the kingpin in its locked position in the recess of the coupling jaw and a second position for unlocking the kingpin from the recess. The locking mechanism further comprises a pivotable lever mounted on the pick-up plate. The lever is pivotable between a first position where the lever engages the coupling claw for locking the coupling claw in its first position. The lever is likewise pivotable to a second position for releasing the coupling claw so as to allow the coupling claw to move to its second position wherein the fifth-wheel kingpin is locked. The specific arrangement of the coupling claw of the present invention is superior to coupling devices heretofore known.

DETAILED DESCRIPTION

Figure 1:
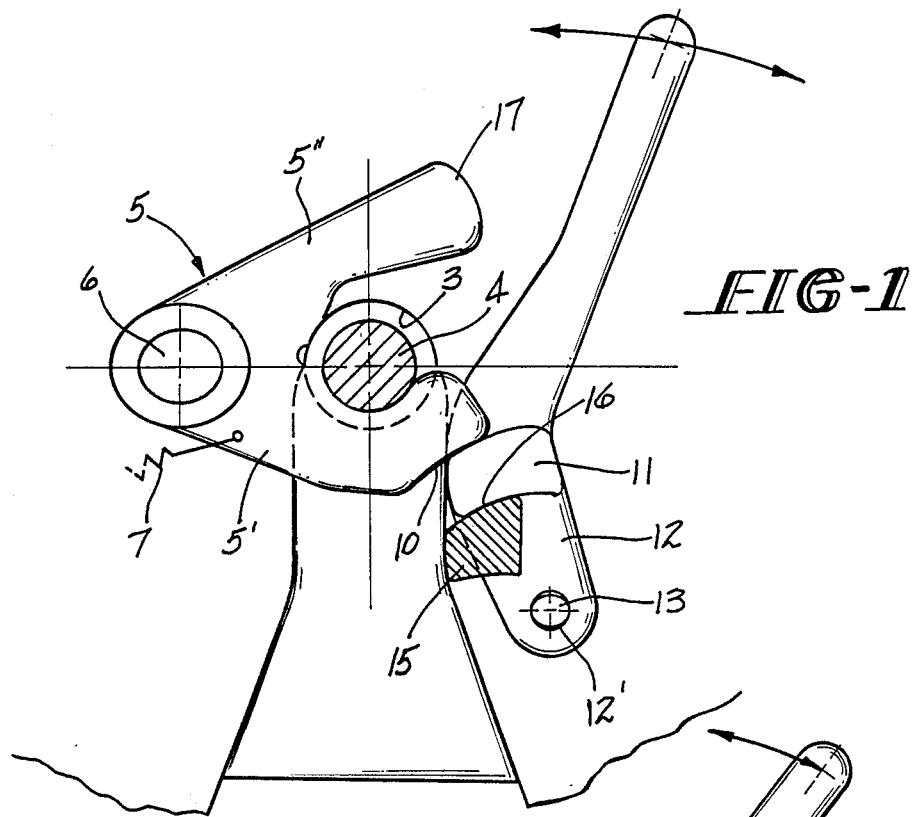
FIG. 1 shows a detailed plan view of the fifth-wheel coupling device of the present invention showing the fifth-wheel in its locked position.
Figure 2:
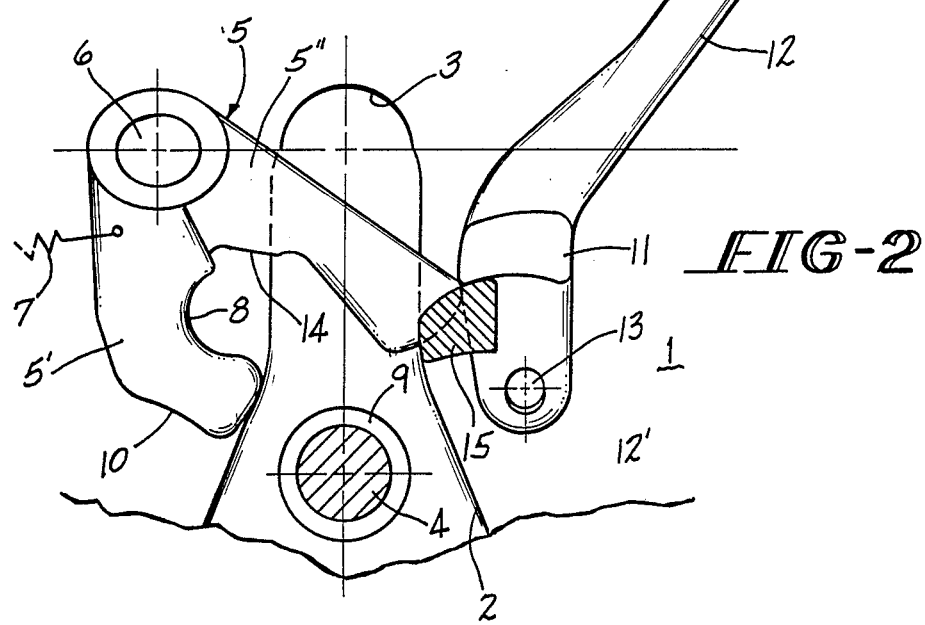
FIG. 2 shows a detailed plan view of the fifth-wheel coupling device of the present invention showing the fifth-wheel in its unlocked position.

The coupling device of the present invention as illustrated in FIGS. 1 and 2 comprises a pick-up plate 1 having a coupling jaw 2 for receiving the fifth-wheel kingpin 4 of a semitrailer. The coupling jaw 2 is provided with a substantially semicircular recess 3 for receiving the fifth-wheel kingpin 4 when in its locked or coupled position as illustrated in FIG. 1. A substantially V-shaped coupling jaw 5 is pivotably mounted about a pivot pin 6 on the pick-up plate 1. The V-shaped coupling claw is provided with first leg 5' and second leg 5" defining a recess for receiving the fifth-wheel kingpin 4 for locking the fifth-wheel kingpin in recess 3 of coupling jaw 2 when the coupling is in its locked position as illustrated in FIG. 1. A spring 7 secured to the pick-up plate 1 and the coupling claw 5 acts on the coupling claw for pivoting the coupling claw downward about pivot pin 2 to the position shown in FIG. 2 for releasing the fifth-wheel kingpin 4 from the recess 3 of coupling jaw 2.

The leg 5' of the coupling claw 5 has a circular segmented-shaped recess 8 for partially surrounding the fifth-wheel kingpin 4 when the coupling device is in its locked position, see FIG. 1. The fifth-wheel kingpin 4 is provided with a collar 9 and a neck pin located at a distance from collar 9. The edge of leg 5' defining the recess 8 engages the fifth-wheel kingpin between the collar 9 and the neck pin for holding the fifth-wheel kingpin in place in recess 3. The outside region of leg 5' opposed to the edge defining recess 8 is provided with an annular segmented-shaped bearing face 10 which, as will be explained hereinbelow is brought into engagement with a locking projection 11 provided on lever 12. The locking projection 11 is formed integrally with the slightly angled one-armed lever 12 which is pivotable on pick-up plate 1 about pin 13. The projection 11 is provided on the side of the lever 12 facing away from pick-up plate 1 so that by pivoting the lever 12 about the pin 13 in the direction of the coupling claw 5, the lever 12 moves under the leg 5' and the locking projection 11 comes into engagement with the bearing face 10 of leg 5' of the coupling claw 5 when the fifth-wheel is introduced in the recess 3 and has brought the coupling claw 5 into the position illustrated in FIG. 1. With the coupling device in its locked position, the coupling claw 5 is supported by the lever 12 on the pick-up plate 1 as well as supported directly on the pick-up plate 1 via the pivot pin 6.

Leg 5" of coupling claw 5 has a rounded free end 17 which, in the uncoupled position shown in FIG. 2, rests against the lever 12. Upon introduction of the fifth-wheel kingpin 4 into coupling jaw 2, the fifth-wheel kingpin takes the leg 5" upward against the force of spring 7. As the fifth-wheel kingpin 4 is further introduced into coupling jaw 2, the collar 9 of the fifth-wheel kingpin 4 comes into engagement with an inner straight bearing face 14 on leg 5" and hence finally into recess 3. Leg 5' passes between the collar 9 and neck pin of the fifth wheel kingpin 4. The locking of the coupling claw 5 is then accomplished by pivoting lever 12 so that locking projection 11 engages bearing face 10 on leg 5'. The lever 12 is designed with a relatively long lever arm thereby increasing the leverage of the lever 12.

Lever 12 is floatingly articulated on pin 13 by providing an oval-shaped opening 12' for receiving the pin 13 wherein the major axis of the oval opening 12' is in the same direction as the major axis of the locking projection 11. A counterstop 15 having a guide face 16 is secured on the pick-up plate 1 in such a way that the lever 12 may be pivoted so that the underside of the locking projection 11 comes into contact with the guide face 16 of counterstop 15. Locking projection 11 is a substantially annular-shaped segment which widens in the direction going away from the coupling jaw 2. The design of the locking projection 11 and the floating mounting of the lever 12 reduce wear on the elements of the coupling device. The locking projection 11 is inserted into the space between bearing face 10 of leg 5' and guide face 16 of counterstop 15 and is adjusted in the space until the projection 11 is firmly locked between face 16 and face 10.

As a result of the design of the coupling device as set forth above, no transverse forces are exerted on the device, specifically lever 12 with the locking pin 11 and therefore the lever 12 may be formed of cast iron as can the pick-up plate 1. Only the coupling claw 5 need be a forged part. As a result, the weight of these parts are reduced. In addition, it can be appreciated that as a result of the overall structure of the coupling device of the present invention, the one-armed lever 12 may be activated for locking and unlocking the fifth-wheel kingpin with relatively small forces.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A coupling device for locking and unlocking a fifth-wheel kingpin of a semitrailer comprising:
    a pick-up plate, said pick-up plate having a coupling jaw provided with a substantially semicircular recess for receiving said fifth wheel kingpin when in the locked position;
    locking means for holding said fifth wheel kingpin in said locked position in said recess, said locking means comprises (1) a coupling claw pivotably mounted on said pick-up plate between a first position for locking said fifth-wheel kingpin in said locked position in said recess and a second position for unlocking said fifth wheel kingpin from said recess, (2) a lever having an oval-shaped opening for receiving a pivot pin provided on said pick-up plate pivotably mounted on said pick-up plate about said pivot pin so as to allow said lever to be floatingly articulated between a first position where said lever engages said coupling claw for locking said coupling claw in said first position and a second position wherein said lever releases said coupling claw thereby allowing said coupling claw to move to said second position for unlocking said fifth wheel kingpin, said lever includes a locking projection thereon for locking said coupling claw in the first position, and (3) guide means provided on said pick-up plate for guiding said locking projection wherein the floatingly mounted lever reduces wear on said projection and said guide means during the locking and unlocking of the coupling device.

2. A coupling device according to claim 1 wherein said coupling claw is substantially V-shaped having first and second leg portions defining a substantially V-shaped opening for receiving said fifth wheel kingpin when in the first position.

3. A coupling device according to claim 2 wherein said first leg portion on a surface defining said V-shaped opening is provided with a recess for partially surrounding said fifth-wheel kingpin when in the first position.

4. A coupling device according to claim 1 wherein said lever is provided with a locking projection for locking said coupling claw in the first position.

5. A coupling device according to claim 4 wherein said coupling claw is substantially V-shaped having first and second leg portions defining a substantially V-shaped opening for receiving said fifth wheel kingpin when in the first position.

6. A coupling device according to claim 5 wherein said first leg portion is provided with a bearing face which engages said locking projection when said coupling claw and said lever are in said first position.

7. A coupling device according to claim 4 wherein the locking projection is in the form of an annular segment that widens in a direction away from the coupling jaw.

8. A coupling device according to claim 2 wherein the second leg is arranged offset in its level relative to the first leg wherein the recess of the first leg has a radius corresponding to that of the fifth-wheel kingpin and the second leg has an inner bearing face.

9. A coupling device according to claim 2 wherein the second leg of the coupling claw is arranged a certain distance from the pick-up plate while the first leg of the coupling claw rests on the pick-up plate.

10. A coupling device according to claim 4 wherein the locking position is provided on that side of the lever which faces away from the pick-up plate.

* * * * *

UNITED STATES PATENT AND TRADEMARK OFFICE
CERTIFICATE OF CORRECTION

PATENT NO. : 4,968,054
DATED : November 6, 1990
INVENTOR(S) : Lothar Jakob

It is certified that error appears in the above-identified patent and that said Letters Patent is hereby corrected as shown below:

```
Column 4, line 3, delete "where"
and insert --wherein--

Column 4, line 52, delete "position"
and insert --projection--
```

Signed and Sealed this

Twenty-eighth Day of April, 1992

Attest:

HARRY F. MANBECK, JR.

*Attesting Officer*     *Commissioner of Patents and Trademarks*